(12) United States Patent
Budgett et al.

(10) Patent No.: US 9,998,179 B2
(45) Date of Patent: Jun. 12, 2018

(54) SHORTING PERIOD CONTROL IN INDUCTIVE POWER TRANSFER SYSTEMS

(71) Applicant: Auckland UniServices Limited, Auckland (NZ)

(72) Inventors: David Budgett, Auckland (NZ); Aiguo Hu, Auckland (NZ); Bob Wang, Auckland (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 1018 days.

(21) Appl. No.: 13/793,010

(22) Filed: Mar. 11, 2013

(65) Prior Publication Data

US 2013/0234531 A1     Sep. 12, 2013

Related U.S. Application Data

(60) Provisional application No. 61/634,989, filed on Mar. 9, 2012.

(51) Int. Cl.
| | |
|---|---|
| *H02J 50/10* | (2016.01) |
| *H02J 50/12* | (2016.01) |
| *H04B 5/00* | (2006.01) |

(52) U.S. Cl.
CPC ......... *H04B 5/0037* (2013.01); *H04B 5/0075* (2013.01)

(58) Field of Classification Search
CPC .............................. H04B 5/0037; H04B 5/0075
USPC ........................................................ 307/104
See application file for complete search history.

(56) References Cited

U.S. PATENT DOCUMENTS

| | | | | |
|---|---|---|---|---|
| 3,938,024 | A * | 2/1976 | Clarke ............... | H02M 3/3378 363/24 |
| 5,293,308 | A * | 3/1994 | Boys et al. ...................... | 363/37 |
| 5,450,305 | A * | 9/1995 | Boys et al. ...................... | 363/24 |
| 5,898,579 | A * | 4/1999 | Boys et al. ...................... | 363/23 |
| 6,100,663 | A * | 8/2000 | Boys et al. .................. | 320/108 |
| 6,188,179 | B1 * | 2/2001 | Boys et al. .................. | 315/244 |
| 6,239,584 | B1 * | 5/2001 | Jang ..................... | H02M 3/158 323/222 |
| 2001/0012208 | A1 * | 8/2001 | Boys .............................. | 363/23 |
| 2006/0285368 | A1 * | 12/2006 | Schlecht ............... | H02M 3/335 363/21.06 |
| 2007/0109708 | A1 * | 5/2007 | Hussman et al. ............. | 361/113 |
| 2007/0296393 | A1 * | 12/2007 | Malpas et al. ................ | 323/355 |
| 2008/0129215 | A1 * | 6/2008 | Boys .......................... | 315/209 R |
| 2008/0211478 | A1 * | 9/2008 | Hussman .................. | H02J 1/00 323/355 |
| 2008/0247210 | A1 * | 10/2008 | Hu ................................. | 363/131 |
| 2009/0303749 | A1 * | 12/2009 | Boys et al. ...................... | 363/13 |

(Continued)

*Primary Examiner* — Rexford Barnie
*Assistant Examiner* — Thai Tran
(74) *Attorney, Agent, or Firm* — Young & Thompson

(57) ABSTRACT

The present invention provides a power supply for an inductive power transfer (IPT) system, comprising a current-fed push-pull resonant converter comprising a parallel-tuned resonant tank and a pair of switches enabling selective shorting of the resonant tank; and a controller adapted to control a shorting period of the resonant converter by selectively operating the switches. Methods for controlling an IPT power supply are also disclosed. The power supply may be controlled to regulate the output of an IPT pick-up inductively coupled with the power supply in use, or to operate at a zero voltage switching (ZVS) frequency.

19 Claims, 11 Drawing Sheets

(56) References Cited

U.S. PATENT DOCUMENTS

2010/0013320 A1\* 1/2010 Shiozaki et al. .............. 307/104
2011/0101790 A1\* 5/2011 Budgett ........................ 307/104
2011/0254379 A1\* 10/2011 Madawala ................... 307/104
2011/0266880 A1\* 11/2011 Kim ....................... H02J 7/025
　　　　　　　　　　　　　　　　　　　　　　　　307/104

\* cited by examiner

SHORTING PERIOD CONTROL IN INDUCTIVE POWER TRANSFER SYSTEMS

FIELD OF THE INVENTION

This invention relates to inductive power transfer (IPT). More particularly, the invention relates to a circuit and methods enabling either or both of primary-side power flow control or zero-voltage switching in IPT systems, in particular transcutaneous energy transfer (TET) systems, by controlling the shorting period of a current-driven push-pull resonant converter without the need for fast detection.

BACKGROUND

Inductive power transfer (IPT) systems are used in a number of applications to transfer power wirelessly using an inductive or magnetic field coupling. In general, an IPT system comprises two main parts or "sides" which are loosely coupled: a primary side comprising a primary conductive path, commonly referred to as a "coil", "track", or "pad" depending upon the application of the IPT system, supplied with a high-frequency alternating current (AC) by a power supply; and a secondary side comprising one or more pick-up circuits inductively coupled with the primary conductor in use, and configured to supply power to a load. The high-frequency alternating current produces a changing magnetic field about the primary conductor, which induces a voltage at the secondary pick-up coil to power the load. The secondary coils in IPT systems are commonly movable with respect to the primary, resulting in a variable coupling due to misalignment or sub-optimal separation.

A particular example of an application of an IPT system is in the powering of implanted biomedical devices, termed transcutaneous energy transfer (TET) in the biomedical field. Previously, an implanted biomedical device such as a heart pump would have been powered from an external battery or other power source by a percutaneous cable, which is a major source of infection. TET systems, on the other hand, integrate or implant an IPT pick-up circuit along with the implanted biomedical device, and are thereby capable of transferring power across the intact skin, eliminating the percutaneous power cable and its associated risks. Other example applications of IPT systems include powering automated guided vehicles (AGVs), and wireless recharging of batteries in a wide range of devices from consumer electronics (such as mobile phones) to electric vehicles (EVs).

In many IPT systems, a power flow controller is desirable to ensure the load always receives the required power level under changing coupling level and load. This is clearly of particular importance in TET systems where the load may comprise a heart pump or artificial cardiac pacemaker, for example, where inadequate (or excess) power transfer may put the health of the implant recipient at risk.

To minimise the size, weight and/or heat generated by the pick-up circuit (which may be movable or implanted, for example) in an IPT system, it is sometimes preferable for the power flow to be controlled from the primary (i.e. external or non-implanted) side of the system.

Si et al. (P. Si, et al., "A Frequency Control Method for Regulating Wireless Power to Implantable Devices," Biomedical Circuits and Systems, IEEE Transactions on, vol. 2, pp. 22-29, 2008) discloses a variable resonant frequency method to regulate the power flow by changing the effective capacitance of the primary through controlling the effective conduction period of additional capacitors parallel to the primary MOSFETs. Dissanayake et al. (T. D. Dissanayake, et al., "Experimental Study of a TET System for Implantable Biomedical Devices," *Biomedical Circuits and Systems, IEEE Transactions on*, vol. 3, pp. 370-378, 2009) discloses an implementation of this frequency control in a TET system for powering heart pumps. However, this technique requires the power supply to have at least four switching devices and a plurality of switched capacitors.

International Patent Publication No. WO 2009/091267 similarly discloses an IPT system which varies the resonant frequency by switching parallel capacitors in and out of the circuit. These additional components may increase the size and cost of at least a part of the IPT system, and can potentially also affect reliability.

In other applications of IPT systems, however, it may be more important to minimise power losses by performing full wave zero voltage switching (ZVS) rather than hard switched regulation. Alternatively, or additionally, there may be applications in which it is necessary or desirable to easily switch between primary-side power flow control and ZVS modes of operation.

Zero voltage switching requires the power supply switches to be opened or closed (i.e. switched off or on, respectively) only at the moments when the instantaneous voltage of the AC waveform is substantially zero (i.e. crossing from a positive to negative voltage, or vice versa). This places less stress and reduces power losses in the switching transistor, and minimises electromagnetic interference (EMI).

However, existing circuits and methods for start-up and ZVS operation require fast feedback loops and initial DC currents at the primary DC inductors to ensure the existence of ZVS points, otherwise switching elements may be damaged.

The circuits of the prior art which provide for either primary-side power flow control or full-wave ZVS switching are generally substantially different. Combining those conventional circuits to achieve economies of scale and/or IPT systems which can easily fulfil either purpose is, therefore, unrealistic.

A further disadvantage of many IPT systems of the prior art is the common requirement for either uni- or bi-directional communication between the primary and secondary sides of the system. This is commonly overcome by including a radio frequency (RF) wireless communications link (typically comprising at least one additional integrated circuit and antenna on each side of the system) between the primary and secondary sides. This adds to the cost, size, complexity, and power requirements of the system, in particular where such a high-bandwidth communications channel is excessive for the communications requirements which may be as simple as merely transmitting on/off commands.

OBJECT OF THE INVENTION

It is therefore an object of the invention to provide a system and/or methods which enables either primary-side power flow control or ZVS switching without any substantial hardware modifications. Alternatively, it is an object of the invention to overcome or at least ameliorate one or more other disadvantages of the prior art, or to at least provide the public with a useful choice.

Further objects of the invention will become apparent from the following description.

SUMMARY OF INVENTION

In a first aspect the invention may broadly be said to consist in a power supply for an inductive power transfer (IPT) system, the power supply comprising:

a current-fed push-pull resonant converter comprising a parallel-tuned resonant tank and a pair of switches enabling selective shorting of the resonant tank; and a controller adapted to control a shorting period of the resonant converter by selectively operating the switches.

Preferably the resonant tank comprises a primary inductive coil and a fixed resonant capacitance.

Preferably the controller is adapted to control the shorting period based solely upon slow feedback. In particular, the power supply and/or IPT system preferably comprises no high speed detection circuits.

Preferably the resonant converter further comprises a splitting transformer coupled to a DC power supply input, and further coupled in parallel to the resonant tank and the pair of switches.

In a particular embodiment of the first aspect of the invention, the controller is preferably adapted to regulate power flow to a pick-up circuit inductively coupled with the primary inductive coil in use, by selectively operating the pair of switches at an appropriate switching frequency to control a variable shorting period of the resonant converter in response to pick-up output feedback received from the pick-up circuit.

Preferably the controller comprises an input for receiving the pick-up output feedback, and two outputs for providing signals for operating the pair of switches, the frequency of said output signals being dependent upon at least the difference between the pick-up output feedback and a reference signal.

Preferably the output signals comprise complementary 50% duty cycle gate drive signals, wherein during each shorting period one of the pair of switches and a body diode of the other switch each conduct. In this case, the controller preferably comprises a differential amplifier, a proportional-integral (PI) control unit and a voltage controlled oscillator (VCO) for generating the output signals from the pick-up output feedback and reference signal.

Alternatively, the controller comprises at least one further input for receiving feedback from the resonant tank, and the output signals comprise a pair of variable duty cycle gate drive signals, wherein both switches conduct during each shorting period. In that case, the controller preferably comprises a differential amplifier, a proportional-integral (PI) control unit, a voltage controlled oscillator (VCO), and a logic circuit for generating the output signals from the pick-up output feedback, resonant tank feedback, and reference signal.

In another particular embodiment of the first aspect of the invention, the controller is preferably adapted to maintain operation of the power supply substantially at a zero voltage switching (ZVS) frequency, by selectively operating the pair of switches at an appropriate frequency to regulate the shorting period of the resonant tank substantially towards zero.

Preferably the controller comprises an input for receiving feedback from the resonant tank, and two outputs for providing signals for operating the pair of switches, the frequency of said output signals being dependent upon at least the shorting period of the resonant tank.

Preferably the controller comprises a shorting period detector and a microcontroller, the microcontroller being programmed to generate the output signals based upon a difference between the output of the shorting period detector and a programmed reference signal.

Preferably the shorting period detector comprises a Schmitt trigger and a logic OR circuit.

Preferably the power supply further comprises a primary communication circuit for communicating with a pick-up circuit inductively coupled with the power supply in use, via the inductive coupling.

Preferably the communication circuit comprises:
means for receiving a signal command; and
means for transmitting the signal by modulating the switching frequency of the resonant tank using at least two predefined communication switching frequencies.

Preferably the communication circuit further comprises means for decoding communications received from a pick-up circuit.

In a preferred embodiment of the first aspect of the invention, the converter is adapted to selectively regulate power flow or operate at a zero voltage switching frequency in accordance with the preceding particular embodiments of the invention.

In a second aspect, the invention may broadly be said to consist in an inductive power transfer (IPT) system comprising a power supply according to the first aspect of the invention, and a pick-up circuit comprising a secondary communication circuit.

Preferably the secondary communication circuit comprises a load shorting circuit for transmitting data to the power supply and/or a voltage level detector for decoding data received from the power supply.

In a third aspect, the invention may broadly be said to consist in a method for controlling operation of an inductive power transfer (IPT) power supply in an IPT system, the power supply comprising a push-pull resonant converter and the method comprising the steps of:
varying a switching frequency of the resonant converter to control a shorting period of the resonant converter; and
limiting the switching frequency to a predetermined regulation range selected to maintain a non-negative impedance phase angle in the resonant converter.

Preferably the step of varying the switching frequency is based solely on slow feedback, whereby no high speed detection is required.

Preferably the maximum frequency of the regulation range is substantially equal to or less than a first zero voltage switching (ZVS) frequency of the IPT system.

In a first particular embodiment of the second aspect of the invention, the method preferably further comprises the step of receiving output feedback from a pick-up circuit inductively coupled with the power supply in use, and the step of varying the switching frequency of the resonant converter further comprises regulating power flow to the pick-up circuit by controlling the switching frequency in response to the output feedback.

Preferably the first ZVS frequency comprises the lowest expected ZVS frequency for the system, taking into account at least a variable coupling and/or load of the IPT system.

Preferably the minimum frequency of the regulation range is equal to or greater than a frequency at or below which a magnitude boosting effect overrides a frequency tuning effect in the IPT system.

Preferably the method further comprises the steps of:
comparing the output feedback with a reference voltage;
generating a control signal dependent upon the difference between the output feedback and reference voltage; and
generating gate drive signals for controlling a pair of shorting switches in the resonant converter, the frequency of said gate drive signals being proportional to the control signal.

Preferably the step of generating a control signal is performed by a proportional-integral (PI) control algorithm, and the step of generating the gate drive signals is performed by a voltage controlled oscillator (VCO) based upon the output of the PI control algorithm.

Preferably the gate drive signals are complementary and have a 50% duty.

Alternatively, the method further comprises receiving feedback from the resonant converter, and the step of generating gate drive signals further comprises varying the duty cycle of the gate drive signals based upon the shorting period of the resonant converter whereby a pair of shorting switches in the resonant converter are both switched on during the shorting period.

In a second particular embodiment of the second aspect of the invention, the step of varying the switching frequency of the resonant converter further comprises maintaining operation of the IPT system substantially at the first ZVS frequency, by controlling the frequency of the converter to regulate a capacitor shorting period of the converter substantially towards zero, wherein the first ZVS frequency is the lowest of one or more system ZVS frequencies, whereby the system automatically accounts for changes in the system ZVS frequencies due to a variable coupling and/or load of the IPT system.

Preferably the method further comprises the steps of:
receiving feedback from the resonant converter;
deriving an analogue signal inversely proportional to the average shorting period in the resonant converter;
comparing the analogue signal to a programmed reference voltage; and
generating gate drive signals for controlling a pair of shorting switches in the resonant converter, the frequency of said gate drive signals being dependent upon the difference between the analogue signal and the programmed reference voltage.

Preferably the method further comprises communicating with a pick-up circuit inductively coupled with the power supply in use.

Preferably the step of communicating with the pick-up circuit comprises transmitting data by selectively varying the shorting period of the resonant converter. This preferably involves selectively operating the power supply at one or more of at least two predefined communication switching frequencies, thereby performing frequency shift keying (FSK) modulation.

Preferably the programmed reference voltage corresponds with a shorting period of zero.

In a fourth aspect, the invention may broadly be said to consist in a method for controlling operation of an inductive power transfer (IPT) system comprising the method of the third aspect of the invention, and the steps of transmitting and/or receiving data to/from the power supply at a secondary communication circuit of a pick-up circuit inductively coupled with the power supply.

Preferably the step of transmitting data to the power supply comprises selectively shorting a pick-up coil of the pick-up circuit to perform load shift keying (LSK) modulation.

Preferably the step of receiving data from the power supply comprises detecting predefined variations in a secondary resonant tank voltage of the pick-up circuit. More preferably, the step comprises comparing the secondary resonant tank voltage with a predefined reference voltage.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Figure 1:
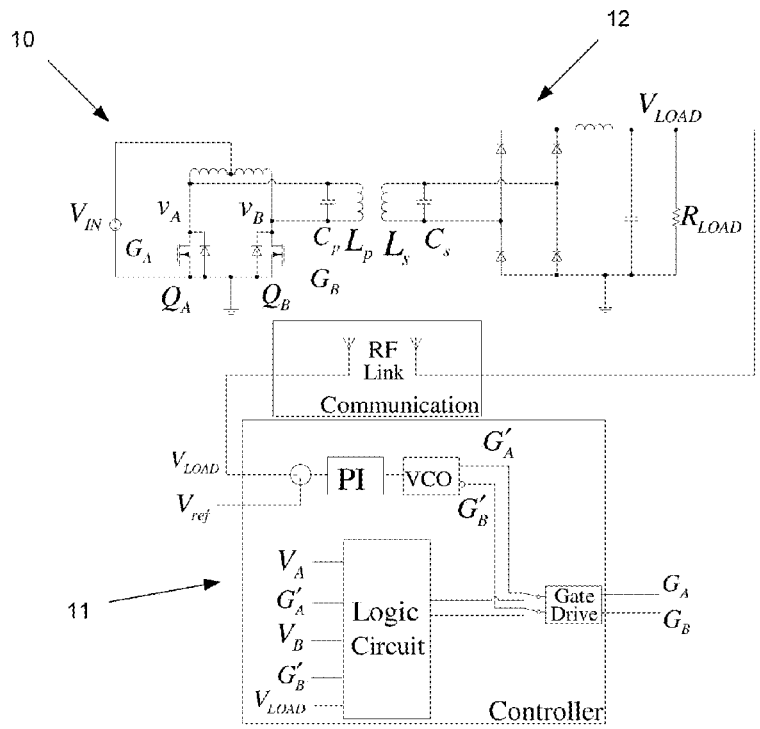
FIG. 1 is a system diagram of a TET system according to a first embodiment of the invention.

Throughout the description like reference numerals will be used to refer to like features in different embodiments.

The term "zero voltage switching (ZVS)" as used herein refers to full wave zero voltage switching. That is, at full wave ZVS operation the shorting switches are switched on/off only when the resonant tank voltage is substantially zero, and the resonant tank voltage preferably has a continuous, substantially sinusoidal waveform. However, it will be appreciated from the following detailed description of the invention that in the primary power flow control mode the shorting switches of the circuit are also switched only when the resonant tank voltage is zero, and the circuit in that mode thus benefits from the same advantages of reduced stress, power losses and EMI. However, the zero volt shorting period between substantially parabolic positive and negative periods of the resonant tank voltage results in a waveform resembling a piecewise function, and operation of the circuit in the primary side power flow control mode is thus not considered full wave zero voltage switching for the purpose of this specification.

Broadly speaking, the invention comprises directly controlling the switching frequency of a resonant converter to short the resonant tank for a selected period. This technique can be applied to achieve power flow control or zero-voltage switching by making simple modifications to the controller. Both of these control techniques are described below with reference to two example TET systems. It is to be appreciated, however, that the method and/or circuit of the invention is not limited to the field of either TET or biomedical devices, but may be used or adapted for use in any IPT system and in any field requiring wireless power transfer, including consumer electronics and industrial applications for example. Furthermore, many variations to the systems illustrated and described herein are possible without departing from the scope of the invention.

Primary-Side Power Flow Control

Referring first to FIG. 1, a system diagram of a first embodiment of a TET system according to the present invention is shown by way of example. As shown, the TET system has a primary side comprising power supply 10, and controller 11; and a secondary side comprising pick-up circuit 12.

The power supply is preferably a push-pull parallel tuned resonant converter comprising a DC power source or input (represented by DC source $V_{IN}$); splitting transformer 13; primary conductor, coil, track or pad represented by primary inductor $L_P$; a fixed primary resonant capacitor $C_P$ provided in parallel with the primary coil $L_P$ and forming a primary resonant tank therewith; and a pair of switches $Q_A$ and $Q_B$ to selectively short the resonant tank. The resonant converter inverts the DC input voltage into a high frequency AC current which flows through the primary coil.

When a current-fed push-pull resonant converter operates at zero voltage switching (ZVS) frequency, the parallel resonant tank is resistive.

In use, the pick-up circuit 12 is inductively coupled with the primary pad, inducing an AC voltage in the secondary coil $L_S$ which is processed to output a DC voltage $V_{LOAD}$ to a load, such as a heart pump, represented by resistor $R_{LOAD}$.

The output voltage $V_{LOAD}$ is regulated by primary side controller 11 which is communicatively coupled to the pick-up circuit 12, in this case by way of a radio frequency (RF) link, to provide closed-loop feedback control. In the example application of the invention described herein in which the load comprises an implantable heart pump, use can be made of the RF channel typically provided for use by the physiological sensors in the heart pump.

Any other alternative communication means can be used, however, without departing from the scope of the invention. Many commercially-available RF communication modules provide a high-bandwidth communication channel capable of transmitting large amount of data across some distance. When simple "on" and "off" commands are required during battery recharging, for example, such sophisticated RF modules are not needed, unnecessarily increasing the cost and size of the system. In a particular embodiment of the invention described in further detail below, the inductive coupling between the primary and secondary sides is used as a medium for uni- or bi-directional communication.

The controller 11 preferably compares the received feedback information ($V_{LOAD}$) with a pre-set reference voltage $V_{ref}$ (by way of a unity gain differential amplifier, for example), and the difference is preferably regulated by a PI (proportional-integral) controller. The PI control circuit generates a DC signal which is fed into a voltage controlled oscillator (VCO), which in turn generates gate drive signals $G'_A$ and $G'_B$ (inversion of $G'_A$) at a suitable frequency.

Basic and Enhanced Modes of Operation

The primary controller 11 can operate in two separate gate drive modes, referred to as the basic mode and enhanced mode, respectively. A manual selection switch may be provided to select the mode, or the controller 11 may alternatively be configured to operate exclusively in either the basic or enhanced mode.

In the basic mode, $G'_A$ and $G'_B$ are used to drive the two power supply switches $Q_A$ and $Q_B$ directly at 50% duty cycle after a gate drive circuit. The primary power supply switches $Q_A$ and $Q_B$ preferably comprise MOSFETs, as shown. During operation, one of the body diodes of the two switches would be conducting if the resonant tank needs to be shorted as described below. The basic mode is capable of operating based solely on a slow feedback PI loop, as it does not require any fast detection. This simplifies the speed and timing requirement of the feedback channel and its components, since the only feedback required is $V_{LOAD}$.

Alternatively, in the enhanced mode both power supply switches $Q_A$ and $Q_B$ would be on (i.e. conducting) during the resonant tank shorting period $T_{sh}$ to reduce the voltage drop of the body diodes and improve the power efficiency slightly. However, the enhanced mode requires a logic circuit, as shown in FIG. 1, with feedback inputs of $V_A$, $G'_A$, $V_B$, $G'_B$ and $V_{LOAD}$. These inputs require fast detection. That is, cycle by cycle ZVS control is based on fast zero crossing detection which requires a delay far less than half the switching period. It will be appreciated, therefore, that the slow feedback required for the basic mode operation offers significant advantages in obviating the need for fast feedback, at the expense of slightly reduced power efficiency. However, those slight inefficiencies may be at least partially offset by reduced controller power requirements due to the lack of fast feedback.

Figure 2:
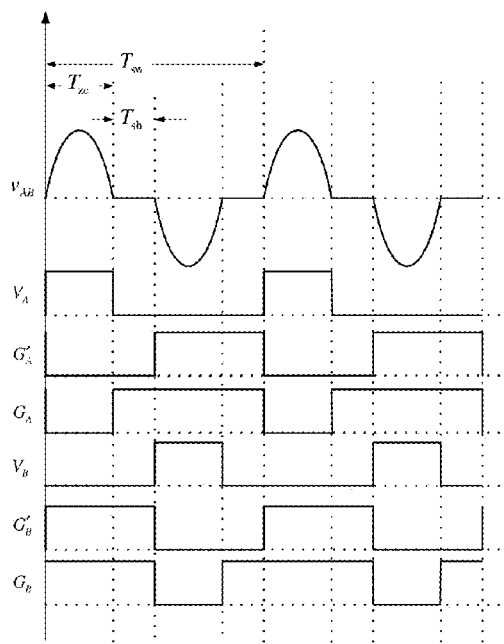
FIG. 2 shows the ideal waveforms of the system of FIG. 1.

FIG. 2 illustrates the ideal circuit waveforms of the system of FIG. 1, where $v_{AB}$ is the differential resonant tank waveform measured from across the resonant capacitor $C_p$, and $V_A$ and $V_B$ are comparator results of power supply switch drain to source voltages ($V_A$ and $V_B$) with respect to ground (i.e. digital signals indicating the presence of a potential difference across switches $Q_A$ and $Q_B$, respectively). The primary power supply switches $Q_A$ and $Q_B$ are driven by the signals $G'_A$ and $G'_B$ (which are simply the VCO outputs) in the basic mode, or by signals $G_A$ and $G_B$ in the enhanced mode.

In the basic gate driving mode, the MOSFET body diodes will take turns to conduct during consecutive resonant tank shorting periods ($T_{sh}$). The resonant tank shorting period $T_{sh}$ occurs twice in every switching period ($T_{sw}$). $T_{zc}$ is the zero crossing period, which is the duration in between two resonant tank shorting periods $T_{sh}$. In enhanced gate drive mode, the MOSFETs' body diodes will cease to conduct as both MOSFETs are on (i.e. conducting) simultaneously during all $T_{sh}$.

The controller 11 varies the frequency of the gate drive signals, and thus the frequency of the AC pad/coil current, between upper and lower limits to regulate the output of the secondary side of the system, as described below.

Switching Frequency Regulation Range

Resonant tank shorting occurs when the MOSFETs are driven with a system switching frequency ($f_{sw}$) that is below the lowest system zero voltage switching frequency ($f_{zvs}$), which means the resonant tank will resonate and then be shorted for a short period by a current loop formed by the two MOSFETs, including their body diodes if basic mode control is employed.

Instant capacitor shorting, not be confused with resonant tank shorting, will occur whenever MOSFETs are switched on (i.e. conducting) and there is a voltage present across resonant capacitor $C_P$, leading to an unwanted high shorting current. This should be avoided to prevent damage to switching components.

It is necessary to find the zero voltage switching frequency $f_{zvs}$ points of the system in order to determine an operating frequency range that avoids instant capacitor shorting. If the harmonics generated by the inverter are ignored, the system $f_{zvs}$ points are found at the zero degree phase angles of the resonant tank impedance. This occurs when the complex part of the impedance equals zero, meaning that the inductive and capacitive elements cancel each other, making the impedance purely resistive. Changes in system parameters can impact on the number of $f_{zvs}$ points as well as their actual values. The system parameters most influential on the power flow of the proposed TET system are the load and coupling level, represented by the mutual inductance M. Under certain conditions, the system will have more than one zero voltage switching frequencies, causing the system to bifurcate.

Figure 3:
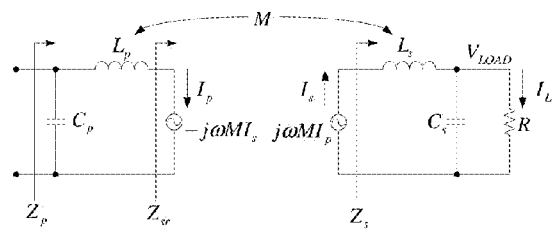
FIG. 3 is an impedance analysis diagram used to find the impedance phase angle of the system of FIG. 1.

The circuit $f_{zvs}$ can be found by applying impedance analysis on the primary and secondary resonant tanks (including load), as shown in FIG. 3. The secondary impedance $Z_s$ is reflected to the primary circuit in series with the primary TET pad inductance, shown as $Z_{sr}$. By finding the resonant tank input impedance $Z_p$, then equating the complex components of $Z_p$ to zero, the phase plot zero crossing points can be calculated using Eq. (1) where M is the mutual inductance, giving the approximate system $f_{zvs}$ points.

$$\omega^6 C_p C_s^2 R^2 (L_p L_s - M^2)^2 - \omega^4 (L_p L_s - M^2)[L_p C_p C_s R^2 + C_s R^2 (L_p C_p + L_s C_s) - C_p (L_p L_s - M^2)] - \omega^2 [L_s (L_p L_s - M^2) - L_p R^2 (L_p C_p + L_s C_s) - C_s R^2 (L_p L_s - M^2)] - L_p R^2 = 0 \quad (1)$$

Alternatively, or additionally, the zero voltage switching frequencies $f_{zvs}$ can be found graphically by using SPICE software such as LTspice from Linear Technology Corporation to frequency sweep the circuit of FIG. 3 to give phase plots of $Z_p$, or plotting $f_{zvs}$ bifurcation trends while stepping load or coupling coefficient k using numerical computing software such as MATLAB from The MathWorks, Inc. The induced voltages from primary to secondary and vice versa need not be included during SPICE simulations as they are an integral part of $L_p$ and $L_s$. To represent the system more accurately, however, primary and secondary equivalent series resistances of capacitances and inductances are preferably included.

Figure 4:
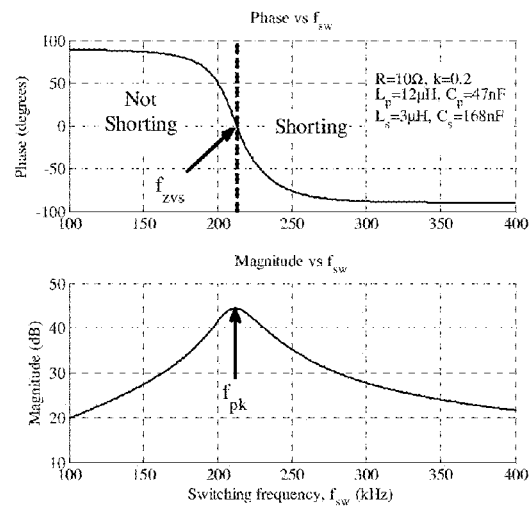
FIG. 4 shows phase and magnitude plots for an example IPT system according to the invention, in a non-bifurcated condition.
Figure 5:
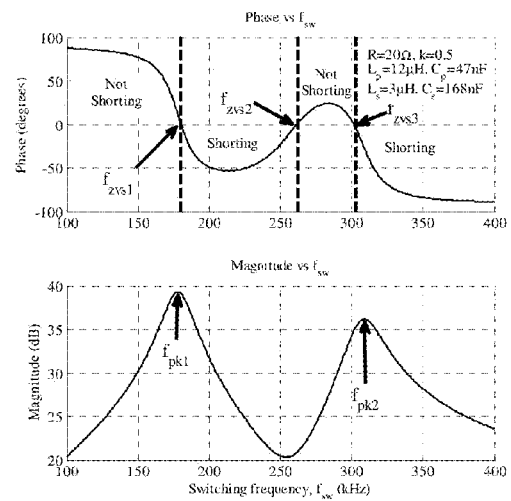
FIG. 5 shows phase and magnitude plots for the same example IPT system in a bifurcated condition.

To illustrate the difference between systems operating with non-bifurcated and bifurcated operating conditions, FIG. 4 shows a non-bifurcated phase plot with a single zero crossing (i.e. one $f_{zvs}$ point), while FIG. 5 shows a bifurcated phase plot with three zero crossings (i.e. three $f_{zvs}$ points).

Instant capacitor shorting occurs at negative resonant tank impedance phase angles. Accordingly, the system of the present invention is preferably constrained to operate within a switching frequency $f_{sw}$ regulation range which results in positive phase angles. The system can typically operate in either non-bifurcated or bifurcated conditions.

FIG. 4 shows the phase angle and magnitude plot for a non-bifurcated condition. It can be seen that the phase angle is positive when $f_{sw}$ is below the single zero voltage switching frequency $f_{vzs}$ (i.e. the frequency at which the phase angle is zero), and is negative when the switching frequency $f_{sw}$ is above the zero voltage switching frequency $f_{zvs}$.

Under a bifurcated condition, as shown by FIG. 5, there are three $f_{zvs}$ points (i.e. three operating frequencies at which the phase angle of the system is zero), with positive phase angles with a switching frequency $f_{sw}$ below $f_{zvs1}$ or between $f_{zvs2}$ and $f_{zvs3}$. The frequency range between $f_{zvs2}$ and $f_{zvs3}$ may be utilised since it has positive phase angles and will avoid instant capacitor shorting, but this frequency range is variable under different loading and coupling conditions, and it is thus difficult to track its bounds. Accordingly, in both non-bifurcated and bifurcated conditions, the upper limit or boundary of the switching frequency $f_{sw}$ regulation range is preferably less than or equal to the lowest zero voltage switching frequency $f_{zvs}$.

In addition, the upper limit of $f_{sw}$ regulation range is affected by the magnitude frequency response of the system. A magnitude frequency sweep of either secondary output voltage ($V_{LOAD}$) or $Z_p$ in FIG. 3 will give the first system peak power flow frequency ($f_{pk}$), which will be less than or equal to the lowest $f_{zvs}$. When the system approaches bifurcation or is in a bifurcated condition, there will be two $f_{pk}$ rather than the single $f_{pk}$ in a non-bifurcated condition. The first $f_{pk}$ tends to decrease as the system becomes more bifurcated. This creates a power flow trough in between the $f_{pk}$ points as shown in the magnitude plot of FIG. 5. In order to maintain monotonicity in negative feedback (i.e. the monotonic relationship between the switching frequency $f_{sw}$ and power flow), the system must maintain operation with a positive magnitude over frequency slope, and thus operate with a switching frequency below the first $f_{pk}$ where the slope is always positive. Therefore, the upper limit of the switching frequency $f_{sw}$ regulation range according to the present invention is preferably set to the first peak power flow frequency $f_{pk}$ (which will be less than or equal to the lowest zero voltage switching frequency $f_{zvs}$) to prevent the PI controller tracking in the wrong direction. For example, the upper limit of the switching frequency $f_{sw}$ should be set to approximately 175 kHz according to the example of FIGS. 4 and 5).

The lower limit of the switching frequency $f_{sw}$ regulation range will be affected by a resonant tank voltage boosting effect in the converter as the switching frequency $f_{sw}$ decreases, as described by Thrimawithana et al (D. J. Thrimawithana and U. K. Madawala, "Analysis of Split-Capacitor Push-Pull Parallel-Resonant Converter in Boost Mode," *Power Electronics, IEEE Transactions on*, vol. 23, pp. 359-368, 2008). Varying $f_{sw}$ has two effects on power flow, the dominating effect in the proposed controller is frequency tuning and detuning as $f_{sw}$ moves toward and away from $f_{pk}$, the lesser effect is a change in resonant tank peak voltage ($V_{pk}$) and resonant tank RMS voltage ($V_{rms}$). An increase in switching period ($T_{sw}$) will lead to an increase in $V_{rms}$ as shown in Eq. (2), leading to increased power transfer.

$$V_{rms} = \frac{1}{2}\pi V_{DC} \sqrt{\frac{T_{sw}}{T_{zc}}} \quad (2)$$

Because $f_{sw}$ reduces with an increase in $T_{sw}$, the system will become increasingly detuned with a dropping power flow. However, $V_{rms}$ will simultaneously increase, counter-acting the frequency tuning effect and acting to increase the power flow. These two power flow effects will superpose and there will be a cross-over point when the magnitude boosting effect overrides frequency tuning effect. According to the present invention, this point shall be set as the lower limit of the switching frequency $f_{sw}$ regulation range, again to maintain the monotonic relationship between power flow and $f_{sw}$ and thereby simplifying the control algorithm.

Additionally, the quality factor Q of the system may affect the selected switching frequency regulation range between the aforementioned upper and lower limits. If Q is increased, the power flow magnitude will be more sensitive to changes in frequency. To maintain the same variation in magnitude, the frequency range would be narrower. On the contrary, if Q is decreased, the frequency range would need to be wider.

Phase Plot Trends and Bifurcation Plots

At increased loading or coupling levels, bifurcation results when the number of phase zero crossing points increase from one to three. The magnitude frequency response begins to show a trough with two peaks $f_{pk}$ emerging on bifurcation rather than the single peak $f_{pk}$ when there is no bifurcation. A series of phase plots can be portrayed through a bifurcation trend plot, which shows $f_{zvs}$ points while a system parameter is being stepped. When the primary and secondary resonant tanks are tuned to a nominal frequency $f_N$, with increased loading or coupling level leading to $f_{zvs}$ bifurcation, two additional zero voltage switching frequencies $f_{zvs}$ emerge on either side of original $f_{zvs}$. These two points will depart from the original $f_{zvs}$, with one rising and the other falling in frequency.

Figure 6:
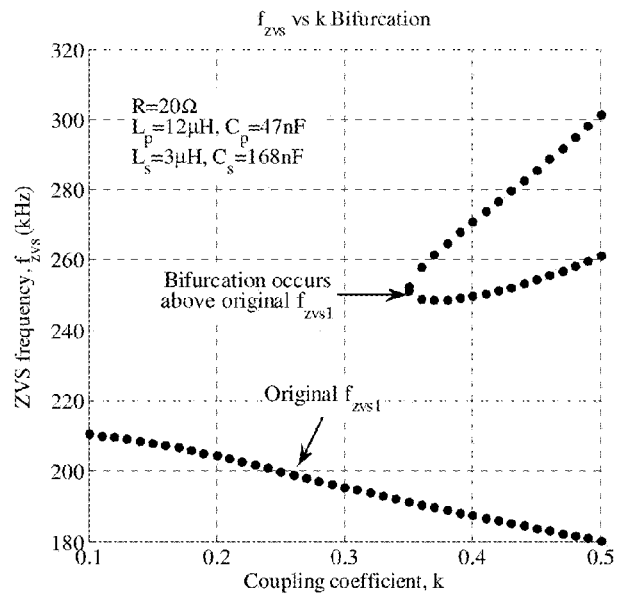
FIG. 6 shows a bifurcation plot for a system having a reduced secondary resonant tank capacitor $C_s$.

Understanding the phase plot trends during system transits from a non-bifurcated condition to a bifurcated condition can help increase the switching frequency $f_{sw}$ regulation range and avoid instant capacitor shorting. As shown in FIG. 6, if the secondary resonant capacitance $C_s$ is chosen to be below the nominal secondary capacitance $C_{sN}$, which is the capacitance that tunes the secondary resonant tank to the nominal frequency $f_N$, at increased load or coupling level leading to $f_{zvs}$ bifurcation the two additional $f_{zvs}$ points will emerge above the original $f_{zvs}$ and will not interfere with controller operations since the switching frequency $f_{sw}$ regulation range is designed to be always below the original zero voltage switching frequency $f_{zvs}$. In the other two bifurcation cases, one being $C_s$ close to $C_{sN}$ or $C_s$ greater than $C_{sN}$, at least one $f_{zvs}$ point emerges below original $f_{zvs}$. Accordingly, in order to accommodate these larger secondary capacitances whilst avoiding instant capacitor shorting, the upper frequency limit must be reduced, resulting in a smaller switching frequency $f_{sw}$ regulation range.

An increase in magnetic coupling M between the primary and secondary sides spreads the bifurcated zero voltage switching frequency $f_{zvs}$ points further apart, leading to a lower first system peak power flow frequency $f_{pk}$. Decreasing $C_s$ will counter this by shifting the entire phase plot to a higher frequency leading to higher first $f_{pk}$ and a larger $f_{sw}$ regulation range. The trade-off is detuning the primary and secondary tanks slightly and thus requiring a higher DC source voltage at the inverter input.

Finding the Switching Frequency Regulation Range

The highest expected coupling level and heaviest load need to be considered in finding the switching frequency $f_{sw}$ regulation range, as this will give the worst case scenario giving the lowest expected first peak power flow frequency $f_{pk}$ on bifurcation. The upper limit of the regulation range is preferably set to or below this worst case first peak power flow frequency $f_{pk}$, and the lower limit of the regulation range is preferably set to or above the worst case frequency at which the magnitude boosting effect overrides the frequency tuning effect.

In the example TET system, the primary and secondary coils or "pads" are encased in silicone with the same diameter of 50 mm, but the primary is double layered and the secondary is single layered. The maximum coupling coefficient k is 0.5 when the TET pads are flat against each other without lateral displacement. Such a best coupling condition is associated with the upper limit of the regulation range (i.e. worst case first peak power flow frequency $f_{pk}$) used by the controller 11. The nominal load of the heart pump is equivalent to 10Ω, and normally it is constant in operation. This translates to loaded quality factor Q of 5.63 and 1.41 at the primary and secondary circuits, respectively. However, a load variation of up to 20Ω is considered herein to illustrate a severe bifurcated situation. FIG. 5 shows the phase and magnitude sweep of this TET system with a coupling coefficient k of 0.5 and a load equivalent resistance of 20Ω. Other system parameters are as shown in Table 1, below.

TABLE 1

| Parameter | Value |
|---|---|
| $L_p$ | 12 μH |
| $C_p$ | 47 nF |
| $L_s$ | 3 μH |
| $C_s$ | 168 nF |

The equivalent mutual inductance M at the highest coupling level is 3 μH. Applying Eq. (1) results in six roots, ±180.26 kHz, ±261.37 kHz and ±301.42 kHz. However, only positive frequencies are practically possible, so the system zero voltage switching frequencies $f_{zvs}$ are 180.26 kHz, 261.37 kHz and 301.42 kHz. The first or lowest zero voltage switching frequency $f_{zvs}$ is thus 180.26 kHz, and the upper limit of the switching frequency $f_{sw}$ regulation range must therefore be equal to, or preferably less than, 180.26 kHz according to this example.

Under a bifurcated condition, however, the peak power flow frequency $f_{pk}$ will be below the lowest $f_{zvs}$. Ideally, the system should operate with a switching frequency $f_{sw}$ below the peak power flow frequency $f_{pk}$, so a magnitude sweep of circuit $V_{LOAD}$ is conducted giving a $f_{pk}$ of 178.52 kHz. The upper limit of the switching frequency $f_{sw}$ regulation range is therefore preferably equal to or less than 178.52 kHz in this example.

This upper limit of the switching frequency $f_{sw}$ regulation range can alternatively be found, or verified, practically by letting the controller 11 run in open loop, with a desirable DC input voltage ($V_{IN}$) and the highest expected coupling level and loading, then tuning the switching frequency $f_{sw}$ upwards toward the theoretical first $f_{pk}$. The frequency when $V_{LOAD}$ peaks can be set as the upper frequency limit. The location of the theoretical first peak power flow frequency $f_{pk}$ approximates the practical frequency, but considers a situation where the resonant tank is fed with perfect sinusoidal waveforms of different frequencies, while in practice the waveforms will be distorted by differing load, coupling level, the resonant tank shorting period and its associated magnitude boosting effect. These factors will deviate the practical magnitude responses from the theoretical and thus change location of the peak power flow frequency $f_{pk}$. In addition, practical component drifts and parasitic elements can cause deviations in the practical switching frequency regulation range from the theoretical calculations.

When the coupling is weak and the system is not bifurcated, for example with a coupling coefficient k of 0.2 and load of 10Ω, FIG. 4 shows the phase and magnitude sweep of the system. From Eq. (1) the six roots can be obtained as −224.47±j419.76, 224.47±j419.76, and ±212.75 kHz. Clearly only 212.75 kHz is a valid frequency, and represents the one and only unique zero voltage switching frequency $f_{zvs}$ point for the system. It will be appreciated that this $f_{zvs}$ is 30 kHz higher than the upper boundary operating frequency corresponding to the closest coupling and bifurcated situation.

From FIGS. 4 and 5, it can be seen that the first peak magnitude corresponding to $f_{pk1}$ of the bifurcated condition is about 5 dB lower than that of the non-bifurcated situation. However, this is not an issue in the system design as long as the system can deliver the rated output power even when the system is bifurcated.

When accounting for component variations and other factors, a frequency margin is needed in practical design to ensure the system can work properly. This may affect the system full power capability and the power efficiency slightly.

The lower limit of the switching frequency $f_{sw}$ regulation range can be found empirically by operating the controller 11 in open loop, and decreasing the switching frequency $f_{sw}$ away from the fully tuned state (i.e. the peak power flow frequency $f_{pk}$). The switching frequency $f_{sw}$ lower limit can be derived when the output voltage $V_{LOAD}$ reaches a minimum and begins to rise, indicating that the magnitude boosting effect is overriding the frequency tuning effect. However in practice the lower boundary need not be at its theoretical minimum and can be set sufficiently low to allow a sufficient frequency range to regulate power flow downwards. In addition, as frequency lowers the magnitude boosting effect causes higher voltage rating requirement for the primary MOSFETs.

PI Controller Parameters

The preferred controller 11 achieves regulation when the output voltage $V_{LOAD}$ is equal to the required output voltage, represented by reference voltage $V_{ref}$, through online tracking (i.e. the action of the PI controller). Important parameters that influence this process include the switching frequency $f_{sw}$ regulation range, primary input voltage $V_{IN}$, coupling level and the output load $R_{LOAD}$. The input voltage $V_{IN}$ should be chosen such that the frequency controller 11 has a margin to vary the power flow up or down in order to achieve regulation. The switching frequency $f_{sw}$ regulation range is first determined as described above. While the system operates under closed loop control, the TET pads can be pushed up flat against each other for the highest coupling level, then $V_{IN}$ is increased so that PI action starts to regulate the output voltage $V_{LOAD}$ to $V_{ref}$ by decreasing the frequency downwards. The required input voltage $V_{IN}$ is found when the switching frequency $f_{sw}$ reaches the lower limit of the regulation range. This procedure ensures that the system is capable of regulating voltage down to $V_{ref}$ under the highest coupling level. As the coupling level drops by separating or misaligning the TET pads, PI actions will increase $f_{sw}$ towards the upper limit of the regulation range to deliver more power, until the separation distance becomes too great to maintain the output voltage at the required level ($V_{ref}$).

Figure 7:
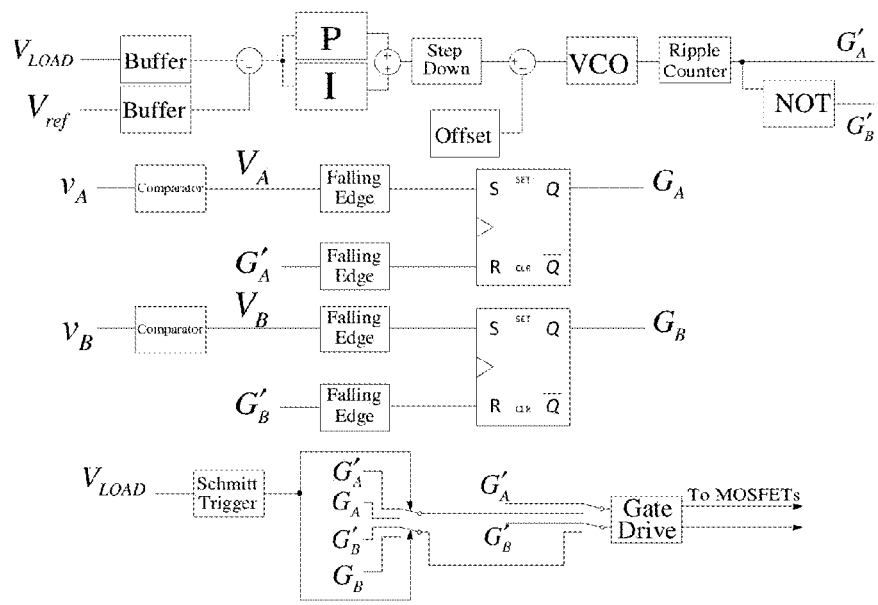
FIG. 7 is a block diagram of a preferred controller according to the present invention.

FIG. 7 shows the preferred controller 11 of the present invention in further detail. Control is preferably based upon a weighted sum of both the proportion and integral of the error between the reference voltage $V_{ref}$ and output voltage $V_{LOAD}$ to vary the switching frequency $f_{sw}$ and regulate the output power flow. This preferred example of a controller comprises discrete components using operational amplifiers (OPAMPs), a voltage controlled oscillator (VCO) and logic devices (in particular, negated AND or NAND gate).

The OPAMPs provide the needed buffering, differencing, summing, offsetting, proportional gain and integral gain functions of the PI controller. The PI output is preferably stepped down through a potentiometer and an offset voltage is added to complete the necessary frequency range level shifting. The resulting DC voltage level is processed by a VCO into a square wave. The square wave output of the VCO does not necessarily have a 50% duty cycle, however, and a ripple counter can be used to half the frequency of the VCO output in order to produce a 50% duty cycle waveform. NAND gates are used to realise the required NOT gate function in order to produce the complement of the VCO output resulting in $G'_A$ and $G'_B$, which are the two complementary 50% duty cycle basic mode gate driving signals. To generate the overlapping gate drive signals $G_A$ and $G_B$ required for enhanced mode operation, the falling edge of $V_A$ is used to set an SR latch while a falling edge of $G'_A$ resets that SR latch producing $G_A$. Similarly a falling edge of $V_B$ sets a second SR latch while a falling edge of $G'_B$ resets the second SR latch producing $G_B$.

The enhanced mode waveforms will step in after $V_{LOAD}$ is above a threshold as it relies on the readiness of the basic mode waveforms, $G'_A$ and $G'_B$, as well as the comparator waveforms $V_A$ and $V_B$.

Alternatively, or additionally, the controller 11 may be implemented at least in part using programmable hardware components, such as programmable logic devices (PLDs) or field programmable gate arrays (FPGAs), or by software executed by a computing means or processor which may include a microcontroller or general purpose personal computer (PC) programmed accordingly. An alternative embodiment of the invention using a microcontroller is described in further detail below with reference to FIG. 12.

Simulated and Experimental Results

Various simulated waveforms for the system described above are shown in FIG. 8. For the purposes of the simulation, the system was configured to regulate the output voltage $V_{LOAD}$ to 10V, the system switching frequency $f_{sw}$ regulation range was calculated according to the method described above and set to 140 kHz to 178.52 kHz, and the simulated $V_{IN}$ range for which regulation is achievable is between 23V and 28V for a load of 10Ω and a 0.2 coupling coefficient k.

Simulations under different coupling levels (0.19 to 0.23) and load variations (7Ω to 50Ω for a 0.2 coupling coefficient k), using the same calculated switching frequency $f_{sw}$ regulation range and $V_{IN}$ set at 25V, show that if the switching frequency $f_{sw}$ regulation range were to increase by lowering the lower limit of the regulation range, the simulated $V_{IN}$, coupling level and load regulation ranges also increase. That is, increases in the $f_{sw}$ regulation range leads to increased controller regulation capability.

The example TET system is required to provide a regulated power output to supply a heart pump, for example, which typically requires 10 W. The power flow controller 11 must overcome variations in TET pad separation and misalignment due to patient movement or pad misalignment, which correspond to variations in the coupling level between primary and secondary. A 10Ω load is used to approximately model a working heart pump.

While the simulated regulation ranges are guides for the practical system, they do not necessarily accurately represent actual practical ranges. The practical switching frequency regulation range of the example system, verified practically as described above, is 149.3 kHz to 182.2 kHz. These frequencies nonetheless represent the frequency at which the magnitude boosting effect overrides the frequency tuning effect, and the first peak power flow frequency $f_{pk}$, respectively, of the practical system.

The simulations and practical measurements show that the example TET system according to the present invention provides good power regulation of 10 W to the load with a TET pad separation ranging from 4 mm to 10 mm, where the minimum distance of 4 mm corresponds to the best coupling situation with the two pads touching, the displacement being due to the silicone casing. The 10 mm distance is the lowest coupling level for maintaining the rated power delivery in this example. Normally the system operates in a non-bifurcated condition. However, when the TET pads are less than about 5 mm from each other, the system may bifurcate. Under both non-bifurcated and bifurcated conditions the example system continues to work well below the first peak power flow frequency $f_{pk}$ within its switching frequency $f_{sw}$ regulation range, thereby avoiding instant capacitor shorting.

Figure 9:
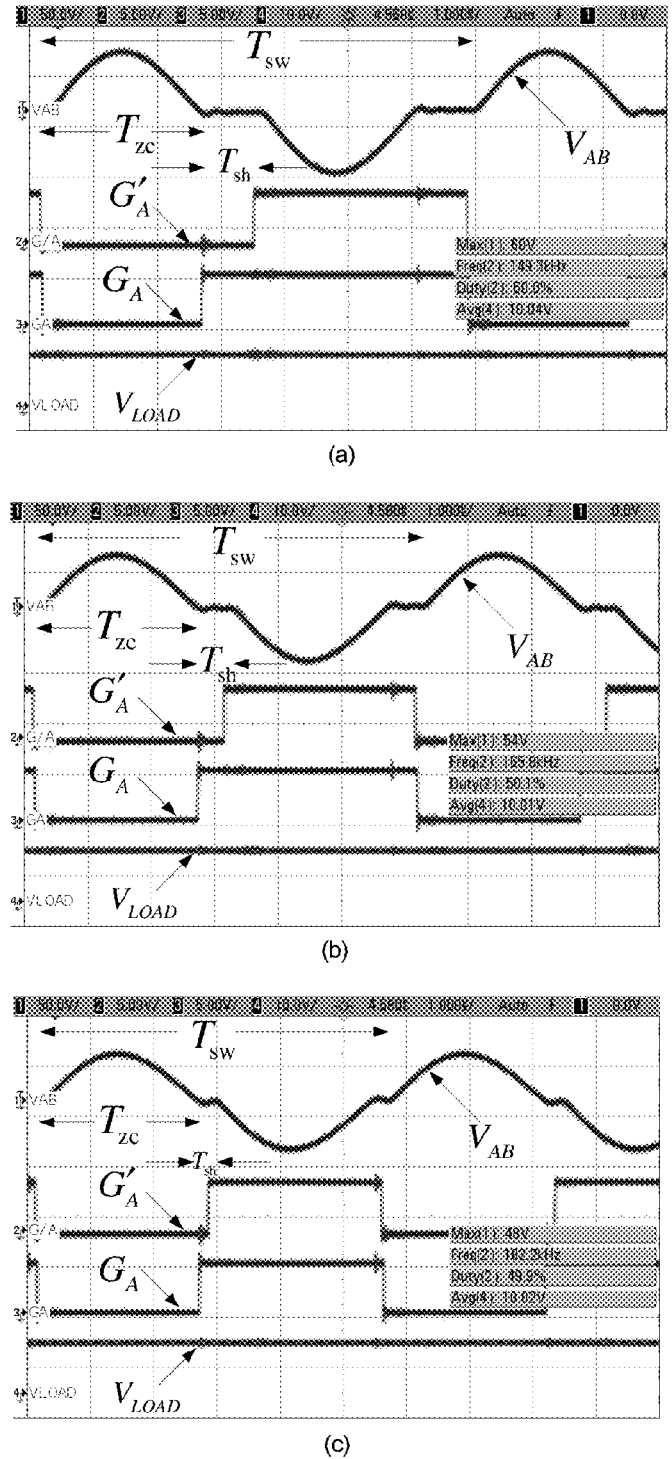
FIG. 9 shows practical circuit waveforms for an example system according to FIGS. 1-8, with pad separation of: (a) 4 mm, (b) 6 mm, and (c) 10 mm.

FIGS. 9(a)-9(c) show practical circuit waveforms of three different TET pad separation distances (4, 6, and 10 mm, respectively) with a DC input voltage $V_{IN}$ of 14V. In all cases the system maintains an output voltage $V_{LOAD}$ of 10V. It is clear that the practical measurement waveforms correspond well to the simulation circuit waveforms and to the ideal circuit waveforms illustrated in FIG. 2. In all three practical circuit waveforms of FIG. 9, the top waveform is the differential resonant tank voltage, $v_{AB}$, the second waveform is the VCO output or basic gate driving mode waveform, $G'_A$, the next waveform is the enhanced mode gate driving waveform, $G_A$, and the last waveform is the output or load voltage, $V_{LOAD}$.

Figure 8:
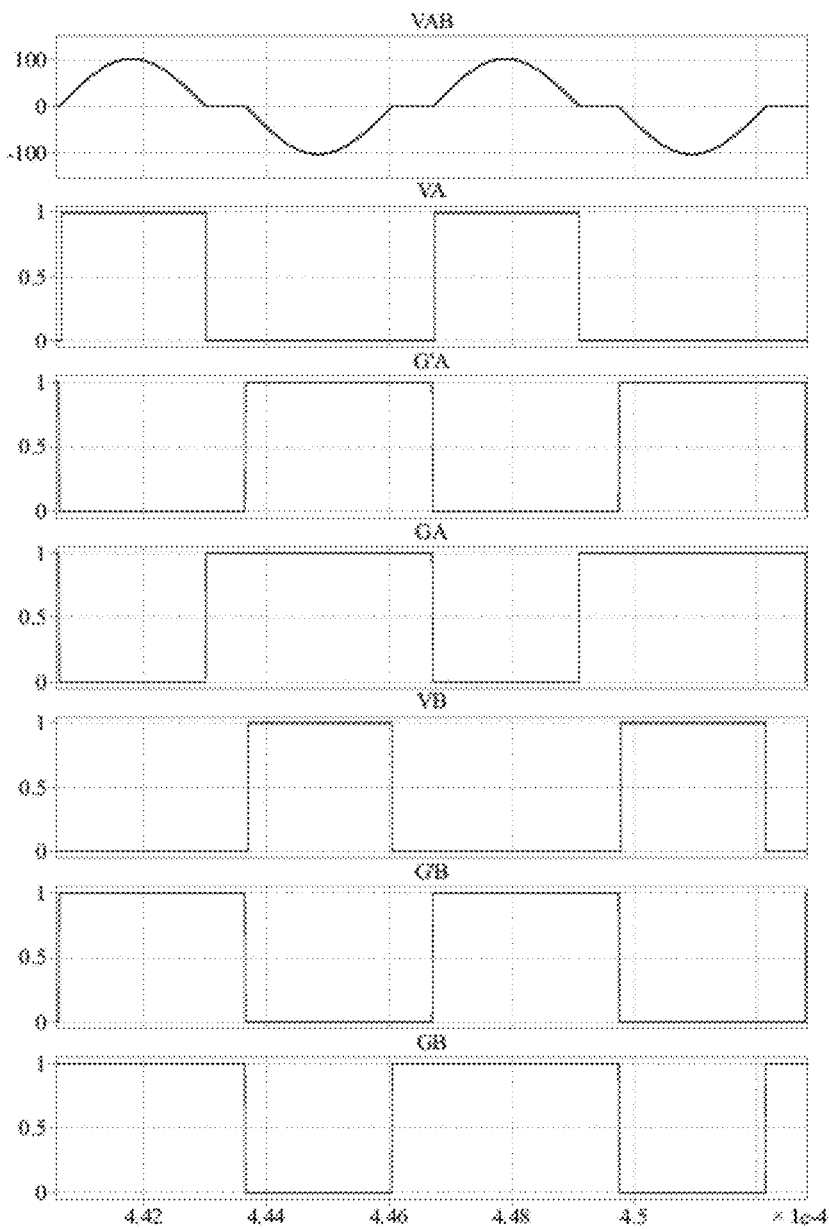
FIG. 8 shows various simulated waveforms for the system of FIGS. 1-7.

All of the simulated and practical waveforms of FIGS. 8 and 9 show the circuit operating in enhanced mode. Operation in the basic gate driving mode will give similar results, but due to body diode conduction during the resonant tank shorting period the efficiency drops slightly. In the example system described above, an end-to-end efficiency of 79.65% was obtained in the enhanced mode and 77.97% in the basic gate driving mode when delivering 10 W at TET pad separation of 10 mm.

Figure 10:
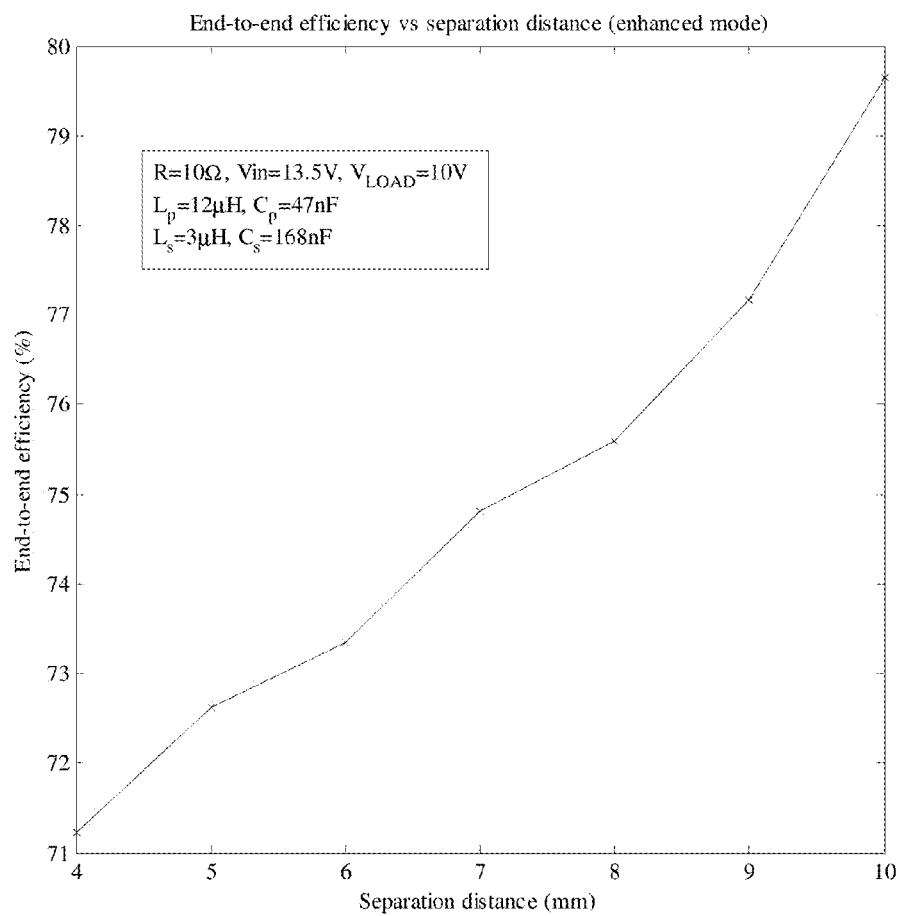
FIG. 10 is a graph of end-to-end efficiency vs separation distance for the example IPT system.
Figure 11:
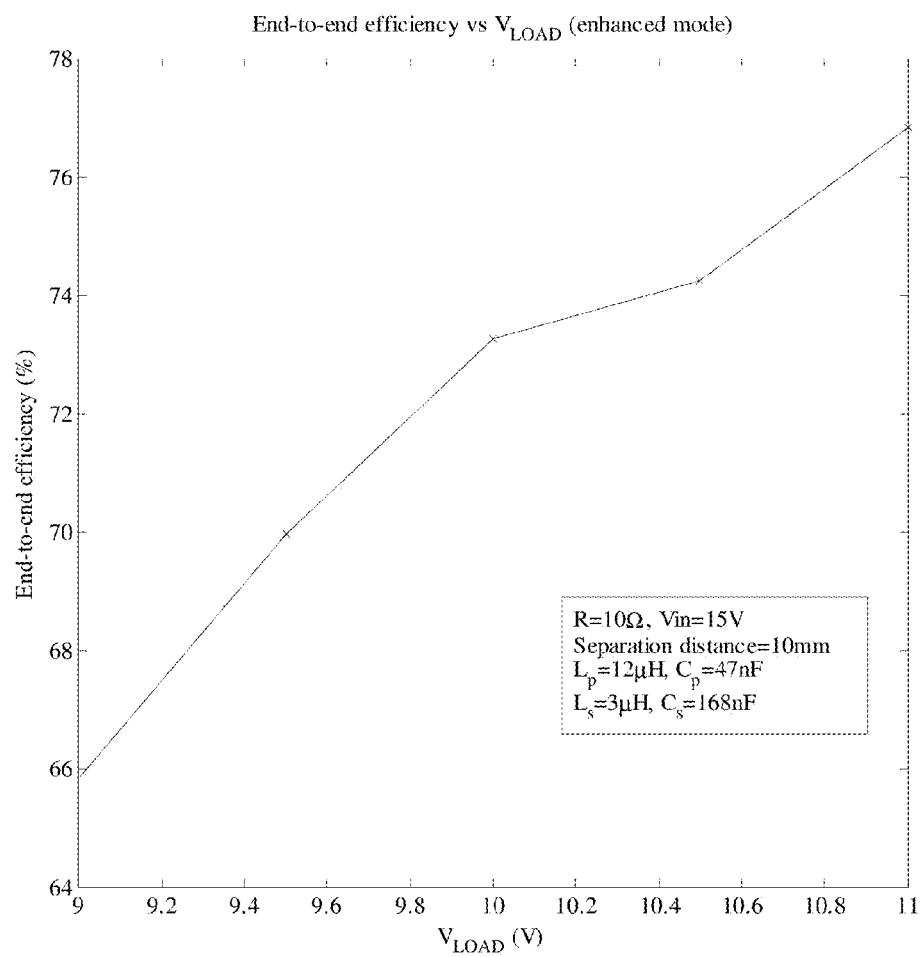
FIG. 11 is a graph of end-to-end efficiency vs load voltage $V_{LOAD}$ for the example IPT system.

FIG. 10 shows the end-to-end efficiencies for enhanced mode operation of the example system under different direct separation distances, where the system is operating with closed loop feedback to regulate the output voltage $V_{LOAD}$ at 10V. FIG. 11 shows the end-to-end efficiencies for enhanced mode under different output voltages $V_{LOAD}$ by operating the system in open loop and varying the operating frequency. It can be seen from these figures that the efficiency of the system improves with increases in the separation distance and output voltage. However, these efficiencies do not include controller power losses as the controller components were fed by separate ±15V and ±5V supplies. The average end-to-end efficiency with controller loss is estimated to be above 70%.

Zero Voltage Switching (ZVS)

As described above, the parallel resonant tank of a current-fed push-pull resonant converter is resistive when operated with zero voltage switching (ZVS). This purely or substantially resistive resonant tank impedance can lead to higher power transfer efficiencies with the desired unity power factor, and ZVS operation may therefore be preferred over the above-described primary-side power flow control in some applications (e.g. where the power supply is to be inductively coupled with multiple pick-up circuits simultaneously, in which case regulation is typically performed at the secondary side of the system by a regulation circuit provided in each pick-up circuit).

The current-fed push-pull resonant converter circuit of the present invention, as described above with respect to the first embodiment of the invention, can be easily adapted to achieve ZVS operation with relatively minor modifications to the controller 11 to control the two power supply switches $Q_A$ and $Q_B$ appropriately. The same controller 11 may be used to implement wireless communication using low bandwidth frequency modulation between its primary and secondary coils, as described in further detail below.

Figure 12:
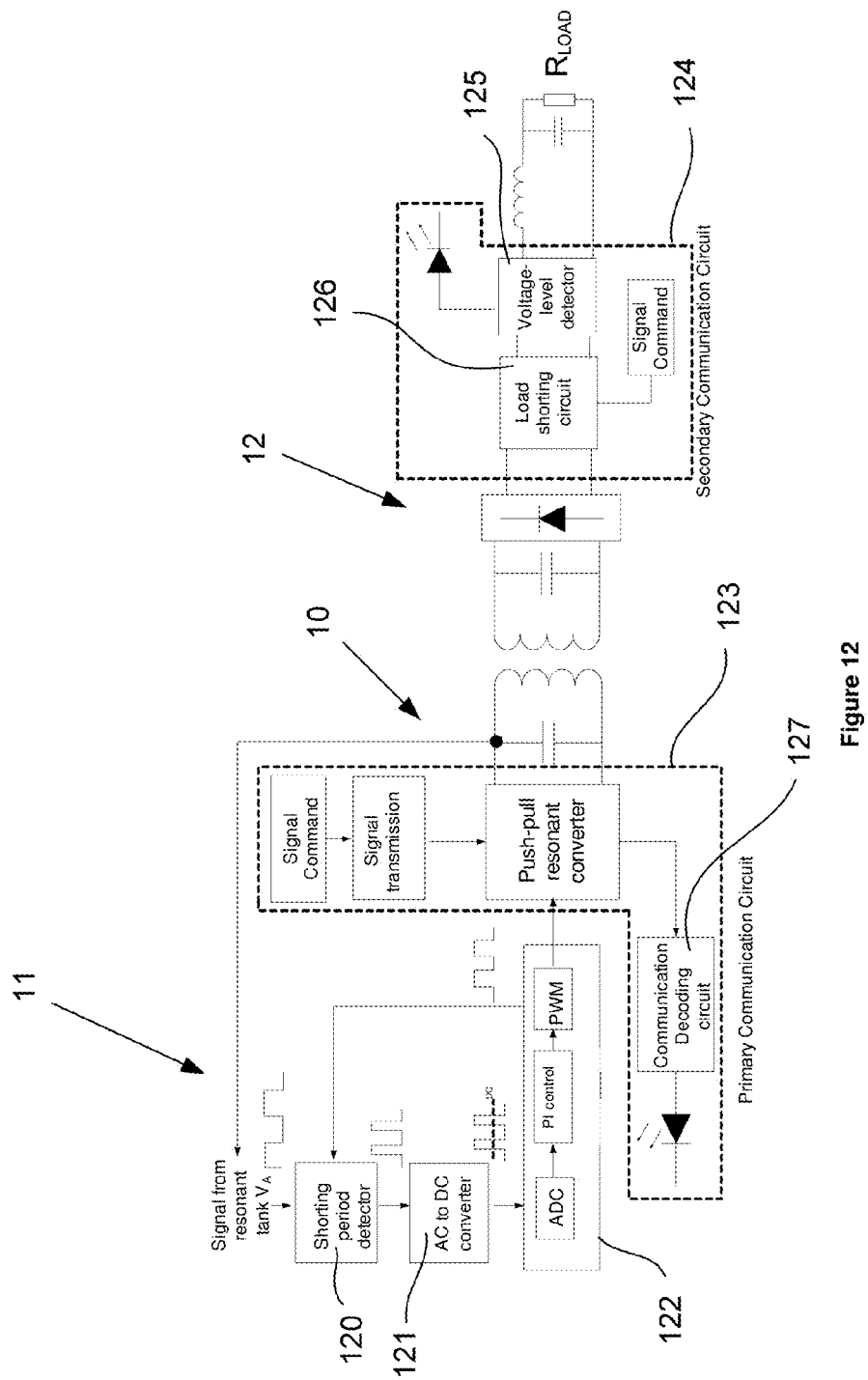
FIG. 12 is a block diagram of an IPT system according to a further embodiment of the invention, adapted to maintain ZVS operation of the power supply.

To assist in describing ZVS operation of the primary power supply circuit 10, a second embodiment of an IPT system according to the invention is illustrated by way of example in the block diagram of FIG. 12. In this embodiment, the controller 11 comprises a combination of discrete electronic components, integrated circuits, and a microcontroller. It will be apparent to a skilled person how the controller 11 of either embodiment of the invention can be modified to perform primary-side power flow control or full-wave ZVS operation. In particular, by programming the microcontroller of the present embodiment, very little (if any) modification of the physical circuit would be required.

To achieve ZVS operation, the system starts up at a low switching frequency $f_{sw}$ and increases towards the ZVS frequency $f_{zvs}$. As the switching frequency $f_{sw}$ increases towards the ZVS frequency $f_{zvs}$, the shorting period $T_{sh}$ decreases. At the ZVS frequency $f_{zvs}$, the shorting period $T_{sh}$ is substantially zero. Accordingly, regulation of the switching frequency $f_{sw}$ to remain at the ZVS frequency $f_{zvs}$ can be achieved by monitoring the shorting period $T_{sh}$ and regulating it towards zero. The system will thus automatically adjust to any changes in the ZVS frequency $f_{zvs}$ due to changes in coupling and/or the load, for example, and can be achieved with slow feedback alone, as described below.

During the regulation, the resonant shorting period $T_{sh}$ is detected by the shorting period detector 120. The AC to DC converter 121 then transforms the shorting period signal $V_{sh}$ into its corresponding DC voltage $V_{sh\_avg}$ so it can be read by microcontroller 122. Through a proportional-integral (PI) controller implemented in software by the microcontroller 122, a waveform at the switching frequency $f_{sw}$ can drive the MOSFETs of the primary power supply circuit 10. The switching frequency $f_{sw}$ is also fed back to the shorting period detector 120. The PI control feedback loop further regulates the detected resonant shorting period until ZVS state is achieved.

Figure 13:
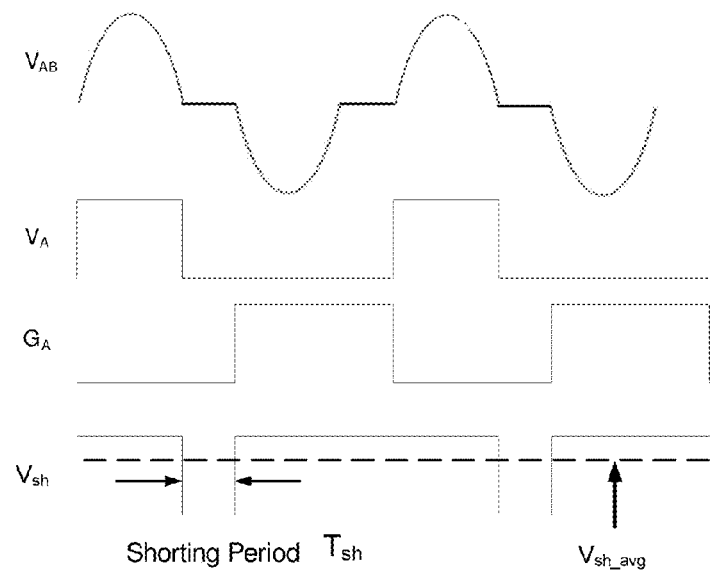
FIG. 13 shows example resonant shorting period detection waveforms.

To detect the resonant tank shorting period $T_{sh}$, the resonant tank differential voltage $v_{AB}$ is processed to attain $V_A$. Example waveforms are shown in FIG. 13. Gate driving signal $G_B$, not shown, is the inverse of gate driving signal $G_A$. The gate driving signal $G_A$ can be OR gated with $V_A$ to attain $V_{sh}$ as shown in FIG. 13. The average of $V_{sh}$, $V_{sh\_avg}$ is obtained through low pass filtering, and is used as a feedback input for the PI control.

The controller 11 acts to converge the average of the shorting period signal $V_{sh\_avg}$ towards a programmed reference voltage $V_{reference}$ which is set to the average shorting voltage (i.e. the maximum voltage of $V_{sh\_avg}$, which corresponds to a 100% duty cycle in the shorting period signal $V_{sh}$) corresponding to the shorting period $T_{sh}$ which results in ZVS operation (i.e. zero). The difference between $V_{sh\_avg}$ and $V_{reference}$ will be processed through PI control giving the system switching frequency $f_{sw}$. The switching frequency $f_{sw}$ will be lower than the zero voltage switching frequency $f_{zvs}$ on start-up. As in the first embodiment of the invention described above, it is necessary to avoid capacitor shorting by operating in a frequency region where the resonant tank impedance phase angle is positive. The system should thus operate below $f_{zvs}$ to ensure a positive phase angle. Through PI control action, $f_{sw}$ will rise and settle just lower than $f_{zvs}$, at which point $V_{sh\_avg}$ is equal to $V_{reference}$. Ideally, the switching frequency $f_{sw}$ would be identical to the ZVS frequency $f_{zvs}$. However, the system is preferably design to ensure a small margin between the switching frequency $f_{sw}$ and ZVS frequency $f_{zvs}$, to avoid instantaneous capacitor shorting (which occurs if the switching frequency exceeds the ZVS frequency). Thus, while the switching frequency $f_{sw}$ may not quite reach the precise ZVS frequency $f_{zvs}$, for practical purposes the switching frequency may be said to be substantially equal to the ZVS frequency $f_{zvs}$ at ZVS operation. An appropriate margin to avoid instant capacitor shorting is preferably selected during system design.

The resonant shorting period detector 120 preferably comprises a Schmitt trigger and a logic OR circuit. The Schmitt trigger converts $v_{AB}$ to $V_A$, preferably using a rising trigger point of 2V and a falling trigger point of 0V to prevent noise interference. The logic OR circuit is preferably implemented using a pair of NOR gates to obtain $V_{sh}$ from $G_A$ and $V_A$.

The microcontroller preferably comprises an analogue-to-digital converter (ADC) for receiving and converting the average shorting period signal $V_{sh\_avg}$ to a digital value for comparison with the programmed reference voltage $V_{reference}$. A resistor in parallel with the low pass capacitor is preferably provided at the input to the ADC for correct operation. This forms a voltage divider within the low pass filter, which reduces the average shorting period signal $V_{sh\_avg}$. The hysteresis of the Schmitt trigger will also lower $V_{sh\_avg}$. The $V_{reference}$ constant is therefore preferably lowered accordingly to compensate for these voltage drops and accurately represent the zero voltage switching position.

The output of the PI control is preferably limited to upper and lower boundary in order to prevent instantaneous shorting of the tuning capacitor. The upper and lower limits of the regulation frequency are preferably the same as those described above with respect to the primary-side power flow control embodiment of the invention, or any suitable range within those limits When the primary coil and secondary coil are aligned and placed adjacent each other with a minimum separation, the ZVS frequency will be at its lowest. When these two coils are at their furthest apart, the ZVS frequency will be at its highest. Therefore, the switching frequency range should encompass these two extremes.

Output from the PI control is preferably used to generate a variable-frequency square wave with a fixed 50% duty cycle to drive the power supply switches. The variable-frequency square wave can be generated using fast pulse width modulation (PWM) performed by the pulse width modulator commonly provided in many microcontrollers. The PWM frequency, and thus the system switching frequency $f_{sw}$, is preferably controlled by setting the TOP limit of the timer/counter (i.e. rather than the default top limit of 255 for an 8-bit counter or 65355 for a 16-bit counter) based upon the output of the PI control. The TOP limit is preferably updated every code loop, and the switching frequency $f_{sw}$ of the system is given by Eq. (3), where $f_{clk}$ is the frequency of the microcontroller system clock, and N is the microcontroller timer prescaler.

$$f_{sw} = \frac{f_{clk}}{N \cdot (1 + \text{TOP})} \quad (3)$$

Simulated and Experimental Results

Figure 14:
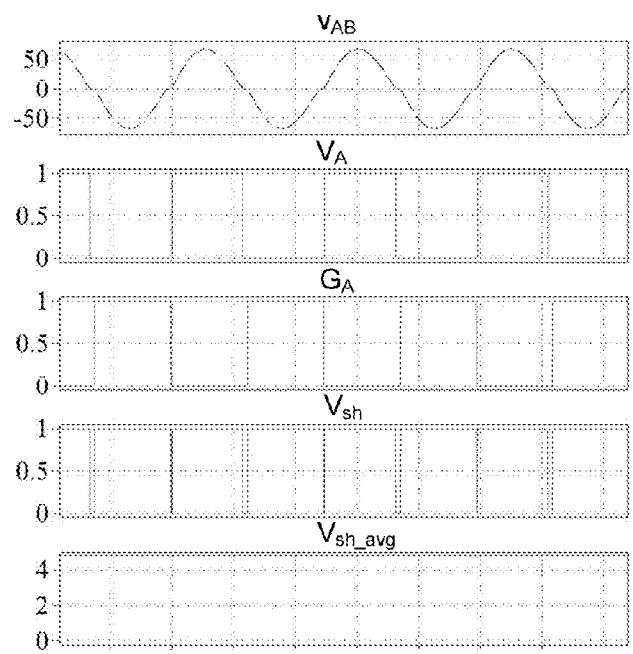
FIG. 14 shows simulated waveforms during ZVS start-up of an example IPT system according to the second embodiment of the invention.

FIG. 14 shows the simulated waveforms for ZVS start-up in which $v_{AB}$ is the differential voltage of the primary resonant tank, $V_A$ is obtained comparing $v_{AB}$ to zero with hysteresis, $G_A$ is the first MOSFET switching waveform, $V_{sh}$ is $V_A$ OR-gated with $G_A$ while $V_{sh\_avg}$ is shown beneath $V_{sh}$.

Figure 15:
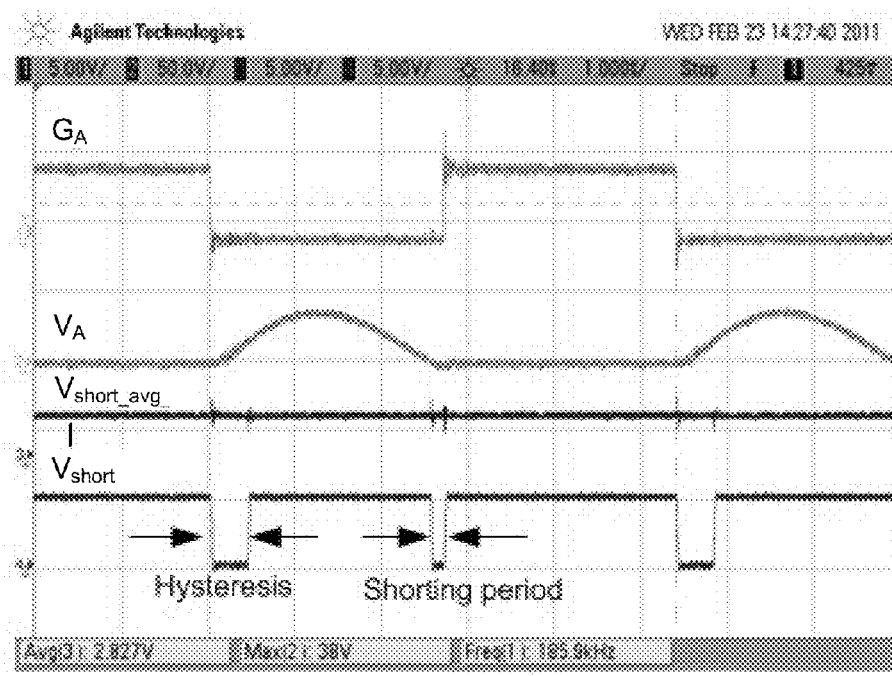
FIG. 15 shows experimental waveforms for a practical example of an IPT system according to the second embodiment of the invention.

FIG. 15 shows the experimental waveforms for ZVS start-up. The simulated and practical waveforms are in agreement with each other. Due to microcontroller resolution, there is a 5 kHz flicker once PI target is reached. This causes a small variation in the secondary output voltage $V_{LOAD}$ and thus the power transferred, but this variation is less than 0.5 V. The system in this embodiment is designed to regulate $f_{sw}$ towards $f_{zvs}$, rather than regulating power transfer, and the DC input voltage must therefore be set sufficiently high to supply the rated power required by the load.

Communication

The ZVS circuit and control method of the invention enables use of the inductive coupling between the primary and secondary sides of the system as a communications medium for uni- or bi-directional communication. In particular, the primary side of the system can transmit data or commands to the secondary side using frequency shift keying (FSK) modulation, and the secondary side can transmit to the primary side using load-shift keying (LSK) modulation. Both communication methods are preferably based upon introducing and detecting variations in the shorting period $T_{sh}$. Communication overrides or suspends the ZVS regulation for only a short predetermined or periodic time period so as not to significantly affect the average power flow.

Communications between the primary and secondary (or vice versa) may comprise one or more specific commands (e.g. on/off commands) which may require transmission and reception of as little as a single bit, or one or more commands may be communicated by a transmitting a particular sequence of bits. Alternatively, or additionally, binary data (e.g. sensor output) can be transmitted in its raw form (i.e. the precise stream or sequence of data bits), or using any suitable standard or proprietary communications protocol without departing from the scope of the invention.

The preferred embodiment of the invention shown by way of example in FIG. 12 comprises a primary communication circuit 123 and a secondary communication circuit 124, both of which are preferably adapted for bi-directional communication (i.e. both transmitting and receiving).

The primary communication circuit 123 preferably comprises means for receiving a signal command, and means for transmitting the signal by modulating the switching frequency of the resonant tank.

The primary and secondary resonant tank networks determine the system magnitude frequency response, which has at least one peak power flow frequency $f_{pk}$ as previously described. To communicate binary data to the secondary side by frequency shift keying (FSK), the system can be driven by two different, predefined, communication switching frequencies. Through this frequency tuning effect, two different load voltages can be attained at the output of the pick-up circuit 12. One voltage level represents a digital high signal while the other represents a digital low signal.

Transmission requires at least two different primary communication switching frequencies; the lower frequency gives a higher amplitude due to the magnitude effect, and the higher frequency gives a lower amplitude. The tank shorting period increase will result in a higher tank amplitude due to a boosting effect in the resonant converter. In addition, the power transferred to the secondary is greater at the higher frequency and lower at the lower frequency. A digital high (binary "1") signal is thus detected at the secondary for the higher switching frequency with lower resonant tank amplitude, and a digital low (binary "0") is detected for a lower switching frequency with higher resonant tank amplitude.

Figure 16:
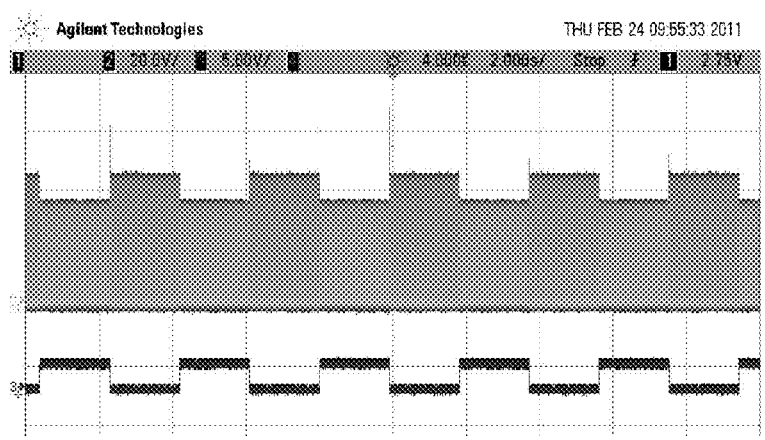
FIG. 16 illustrates two relevant system waveforms during primary to secondary communication according to the method of the invention.

FIG. 16 shows the relevant waveforms for primary to secondary communication, in which the system is transmitting alternating binary data. The upper waveform is the primary resonant tank voltage of the push-pull resonant converter, and the lower waveform is the output of the secondary voltage level detector 125.

Figure 17:
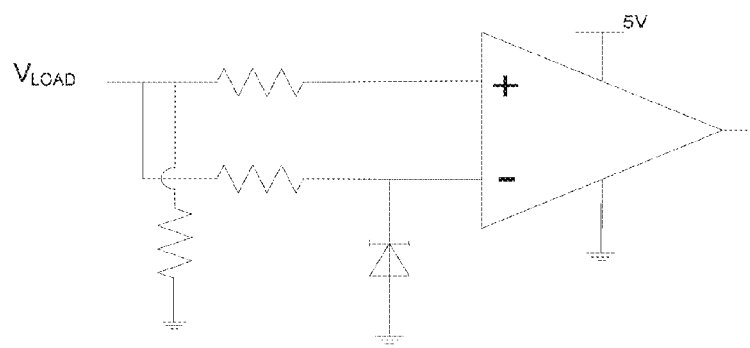
FIG. 17 is a circuit diagram of a preferred secondary voltage-level detector.

An example circuit diagram for the voltage level detector 125 is shown in FIG. 17. The circuit comprises an operational amplifier (op-amp) which compares the secondary load voltage $V_{LOAD}$ with a voltage reference set by a Zener diode.

Using two communication switching frequencies of 160 kHz and 200 kHz at the primary, for example, gives a voltage-level change of 2 V in the secondary output voltage $V_{LOAD}$. When communication is required, power flow will vary significantly, for example from 10 W to 6 W. Therefore, communication will preferably override ZVS control only temporarily for relatively short time periods to minimise any undesired effect on power flow. The power change can also be reduced by decreasing the difference between the two communication switching frequencies and adjusting the secondary voltage-level detector's reference voltage accordingly to distinguish the high and low states at the secondary side.

For secondary to primary communication, the pick-up coil of the secondary pick-up circuit 12 is preferably selectively shorted by a parallel load shorting circuit 126. The key-on and key-off operations in the load shorting circuit 126 generate two different reflected impedances, resulting in two different resonant shorting periods in the primary resonant tank. Through this reflected impedance effect, two different voltage-levels can be observed in the primary resonant tank. One voltage level represents a digital high (or binary "1") signal and the other represents a digital low (or binary "0") signal for serial communication to the primary side of the system.

Shorting the pickup coil causes the power flow curve (as shown in FIG. 4(b), for example) to shift higher in frequency. This will move the system zero voltage switching frequency $f_{zvs}$ higher as well. Given that the primary switching frequency $f_{sw}$ will remain constant (since ZVS control is suspended during communication), the difference between the switching frequency $f_{sw}$ and zero voltage switching frequency $f_{zvs}$ will increase and the primary resonant tank shorting period will also increase, leading to a higher resonant voltage amplitude.

In the non-shorted mode, the difference between $f_{sw}$ and $f_{zvs}$ is less, resulting in a smaller resonant tank shorting period and smaller resonant tank voltage amplitude. A digital low signal occurs for a larger difference (occurring in the shorting mode) in frequency between the zero voltage switching frequency $f_{zvs}$ and system switching frequency $f_{sw}$ while a digital high signal occurs for a smaller difference in frequency (occurring in the non-shorted mode) between $f_{zvs}$ and $f_{sw}$.

Figure 18:
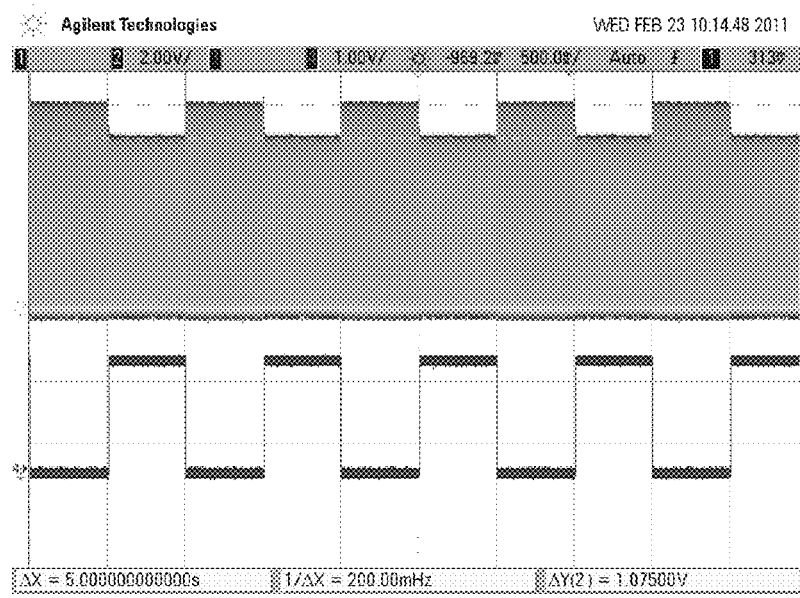
FIG. 18 illustrates two relevant system waveforms during primary to secondary communication according to the method of the invention.

FIG. 18 shows the relevant waveforms for secondary to primary communication, where the upper waveform is the primary resonant tank voltage and the lower waveform is the output of the primary communication decoding circuit 127, which detects the variations in the primary resonant tank voltage and decodes these to the serial binary data transmitted by the secondary communication circuit. The communication decoding circuit 127 may comprise the same or similar circuitry as the shorting period detector 120 and AC to DC converter 121 with a comparator (as in the voltage level detector 125) to detect changes in the primary resonant tank shorting period.

Both the communication decoding circuit 127 and voltage level detector 125 are shown in the diagram coupled to a light emitting diode which would be lit when a logic high (binary 1) signal is detected, but in practice would typically be coupled to an external circuit requiring communication between the primary and secondary sides of the system.

Similar to primary-secondary communication, power flow varies between 10 W and 6 W while transmitting data in the example system. This variation preferably occurs only for a relatively short time period to minimise interruptions in power flow to the load, and can be reduced by selecting two closer communication frequencies.

Conclusion

From the foregoing it will be seen that an IPT system, IPT power supply, primary control circuit, and associated control methods are provided which conveniently and simply enable primary-side power flow control and zero voltage switching operation.

The power flow control method selectively operates a pair of switches in a push-pull resonant converter to short the resonant tank for a suitable period, and enables primary-side regulation of the secondary output without any additional secondary regulation circuitry. The resulting system has a reduced component count compared to the existing primary-side frequency controllers of the prior art, in particular in which the basic mode which uses slow feedback alone. The realised power flow controller demonstrates good power flow regulation under both non-bifurcated and bifurcated operating conditions, and uses a defined frequency regulation range to avoid capacitor shorting under both conditions.

The same push-pull resonant converter and controller can alternatively use a slow feedback loop to detect the resonant shorting period and automatically track a ZVS frequency with coupling variations. Low bandwidth communication is also possible.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A power supply for an inductive power transfer (IPT) system, the power supply comprising:
   a. a current-fed push-pull resonant converter comprising a parallel-tuned resonant tank and a pair of switches enabling selective shorting of the resonant tank; and
   b. a controller adapted to control a shorting period of the resonant converter by selectively operating the switches, wherein the controller is adapted to control the shorting period based solely upon slow feedback.

2. The power supply of claim 1,
wherein the resonant converter further comprises
a splitting transformer coupled to a DC power supply input, and further coupled in parallel to the resonant tank and the pair of switches.

3. The power supply of claim 1, wherein the controller is adapted to regulate power flow to a pick-up circuit inductively coupled with the primary inductive coil in use, by selectively operating the pair of switches at an appropriate switching frequency to control a variable shorting period of the resonant converter in response to pick-up output feedback received from the pick-up circuit.

4. The power supply of claim 1, wherein the controller comprises an input for receiving the pick-up output feedback, and two outputs for providing signals for operating the pair of switches, the frequency of said output signals being dependent upon at least the difference between the pick-up output feedback and a reference signal.

5. The power supply of claim 4, wherein the output signals comprise complementary 50% duty cycle gate drive signals, wherein during each shorting period one of the pair of switches and a body diode of the other switch each conduct.

6. The power supply of claim 4, further comprising at least one further input for receiving feedback from the resonant tank, and the output signals comprise a pair of variable duty cycle gate drive signals, wherein both switches conduct during each shorting period.

7. The power supply of claim 1, wherein the controller is adapted to maintain operation of the power supply substantially at a zero voltage switching (ZVS) frequency, by selectively operating the pair of switches at an appropriate frequency to regulate the shorting period of the resonant tank substantially towards zero.

8. The power supply of claim 7, wherein the controller comprises an input for receiving feedback from the resonant tank, and two outputs for providing signals for operating the pair of switches, the frequency of said output signals being dependent upon at least the shorting period of the resonant tank.

9. The power supply of claim 1, wherein the controller comprises a shorting period detector and a microcontroller, the microcontroller being programmed to generate the output signals based upon a difference between the output of the shorting period detector and a programmed reference signal.

10. The power supply of claim 1, further comprising a primary communication circuit for communicating with a pick-up circuit inductively coupled with the power supply in use, via the inductive coupling.

11. An inductive power transfer (IPT) system comprising a power supply according to claim 1, and a pick-up circuit comprising a secondary communication circuit.

12. The power supply of claim 1, wherein the control of the shorting period is adapted to control an output of the power supply to an inductive power transfer (IPT) pick-up.

13. A method for controlling operation of an inductive power transfer (IPT) power supply in an IPT system, the power supply comprising a push-pull resonant converter and the method comprising the steps of:
  a. varying a switching frequency of the resonant converter to control a shorting period of the resonant converter; and
  b. limiting the switching frequency to a predetermined regulation range selected to maintain a non-negative impedance phase angle in the resonant converter,
  wherein the step of varying the switching frequency is based solely on slow feedback.

14. The method of claim 13, wherein the maximum frequency of the regulation range is substantially equal to or less than a first zero voltage switching (ZVS) frequency of the IPT system.

15. The method of claim 14, wherein the first ZVS frequency comprises the lowest expected ZVS frequency for the system.

16. The method of claim 13, wherein the minimum frequency of the regulation range is equal to or greater than a frequency at or below which a magnitude boosting effect overrides a frequency tuning effect in the IPT system.

17. The method of claim 13, wherein the step of varying the switching frequency of the resonant converter further comprises maintaining operation of the IPT system substantially at the first ZVS frequency, by controlling the frequency of the converter to regulate a capacitor shorting period of the converter substantially towards zero, wherein the first ZVS frequency is the lowest of one or more system ZVS frequencies, whereby the system automatically accounts for changes in the system ZVS frequencies due to a variable coupling and/or load of the IPT system.

18. The method of claim 13, wherein the method further comprises the steps of:
  a. receiving feedback from the resonant converter;
  b. deriving an analogue signal inversely proportional to the average shorting period in the resonant converter;
  c. comparing the analogue signal to a programmed reference voltage; and
  d. generating gate drive signals for controlling a pair of shorting switches in the resonant converter, the frequency of said gate drive signals being dependent upon the difference between the analogue signal and the programmed reference voltage.

19. The method of claim 13, wherein the method further comprises communicating with a pick-up circuit inductively coupled with the power supply in use, via the inductive coupling.

* * * * *